(12) United States Patent  (10) Patent No.: US 8,994,592 B2
Scott et al.  (45) Date of Patent: Mar. 31, 2015

(54) ADDITIVE MANUFACTURING APPARATUS AND METHOD

(75) Inventors: Simon P Scott, Newcastle-Under-Lyme (GB); Chris Sutcliffe, Liverpool (GB)

(73) Assignee: MTT Technologies Limited, Wotton-under-Edge (GB)

( * ) Notice: Subject to any disclaimer, the term of this patent is extended or adjusted under 35 U.S.C. 154(b) by 834 days.

(21) Appl. No.: 13/125,208

(22) PCT Filed: Oct. 30, 2009

(86) PCT No.: PCT/GB2009/002580
§ 371 (c)(1),
(2), (4) Date: Jun. 13, 2011

(87) PCT Pub. No.: WO2010/049696
PCT Pub. Date: May 6, 2010

(65) Prior Publication Data
US 2011/0241947 A1   Oct. 6, 2011

(30) Foreign Application Priority Data
Oct. 30, 2008 (GB) .................................. 0819935.8

(51) Int. Cl.
*H01Q 1/38* (2006.01)
*B29C 67/00* (2006.01)
*B22F 3/105* (2006.01)
(52) U.S. Cl.
CPC .......... *B29C 67/0085* (2013.01); *B22F 3/1055* (2013.01); *B22F 2998/00* (2013.01); *B29C 67/0077* (2013.01); *B22F 2003/1058* (2013.01)

USPC ................................... 343/700 MS; 343/705
(58) Field of Classification Search
USPC ........... 343/700 MS, 705, 708, 879, 912, 943
See application file for complete search history.

(56) References Cited

U.S. PATENT DOCUMENTS

| | | |
|---|---|---|
| 4,863,538 A | 9/1989 | Deckard |
| 4,927,992 A | 5/1990 | Whitlow et al. |
| 4,938,816 A | 7/1990 | Beaman et al. |
| 5,173,220 A | 12/1992 | Reiff et al. |
| 5,252,264 A | 10/1993 | Forderhase et al. |
| 5,648,450 A | 7/1997 | Dickens, Jr. et al. |
| 5,658,412 A | 8/1997 | Retallick et al. |
| 5,753,274 A | 5/1998 | Wilkening et al. |

(Continued)

FOREIGN PATENT DOCUMENTS

| | | |
|---|---|---|
| EP | 1 279 480 A1 | 1/2003 |
| EP | 1 384 565 A1 | 1/2004 |

(Continued)

OTHER PUBLICATIONS

Written Opinion of the International Searching Authority issued in International Application No. PCT/GB2009/002580 on Jul. 6, 2010.

(Continued)

*Primary Examiner* — Thien M Le
(74) *Attorney, Agent, or Firm* — Oliff PLC

(57) ABSTRACT

An apparatus (10) for forming a three dimensional object (30) by layer-wise addition of a build material has a build-support (100) for supporting the object (30) during forming and a removable metallic base-layer (110) that is in the form of a mesh, film, sheet or foil. The base-layer (110) is removably securable to the build support (100).

25 Claims, 8 Drawing Sheets

(56) References Cited

U.S. PATENT DOCUMENTS

Figure 1:
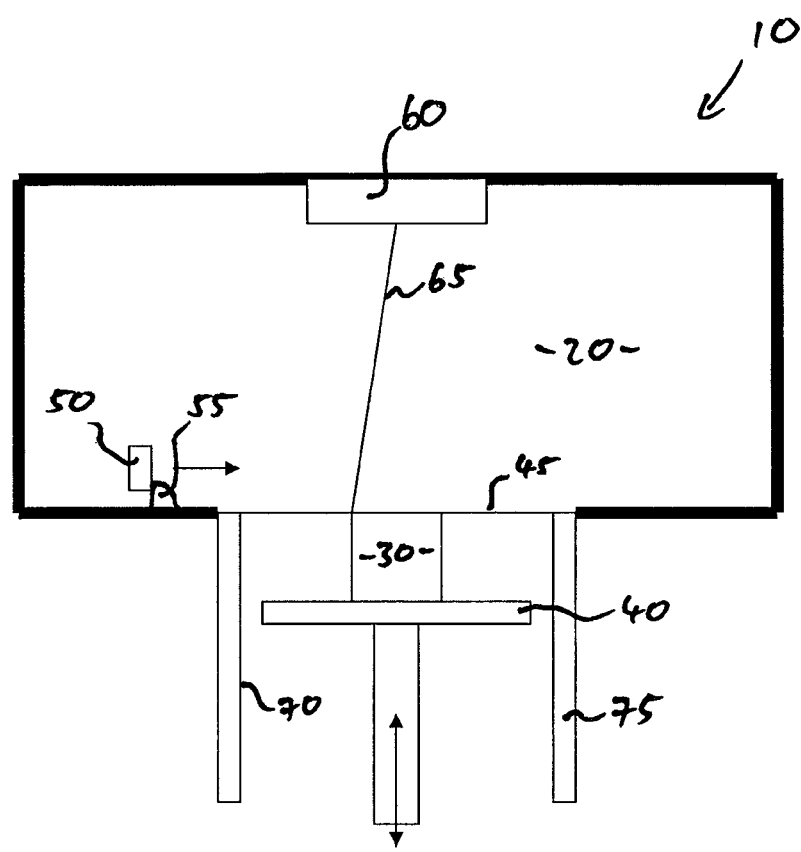

| | | | |
|---|---|---|---|
| 5,997,795 | A | 12/1999 | Danforth et al. |
| 6,042,774 | A | 3/2000 | Wilkening et al. |
| 7,889,142 | B1* | 2/2011 | Westman .................. 343/705 |
| 2004/0020435 | A1* | 2/2004 | Tsuchiya et al. ........ 118/723 VE |
| 2004/0207123 | A1 | 10/2004 | Patel et al. |
| 2007/0040702 | A1* | 2/2007 | Mosher et al. ................ 340/943 |
| 2007/0134359 | A1 | 6/2007 | Farnworth |
| 2008/0278388 | A1* | 11/2008 | McKivergan et al. ........ 343/708 |
| 2008/0311806 | A1* | 12/2008 | Mead .............................. 441/74 |

FOREIGN PATENT DOCUMENTS

| | | |
|---|---|---|
| JP | A-2-128829 | 5/1990 |
| JP | A-4-255327 | 9/1992 |
| JP | A-08-281807 | 10/1996 |
| WO | WO 99/37454 | 7/1999 |
| WO | WO 2006/131716 A2 | 12/2006 |

OTHER PUBLICATIONS

Jan. 7, 2013 European Office Action issued in European Application No. 09 748 834.0.

Mar. 27, 2013 Chinese Office Action issued in Chinese Application No. 200980143099.8 (with translation).

International Search Report issued in International Application No. PCT/GB2009/002580 on Jul. 6, 2010.

Sep. 9, 2013 Office Action issued in Chinese Patent Application No. 200980143099.8 (with translation).

Japanese Patent Office, Official Notice of Rejection mailed Jan. 28, 2014 in Japanese Patent Application No. 2011-533818 w/English-language Translation.

König et al., "Approaches to Prototyping of Metallic Parts", Proceedings of the 2$^{nd}$ European Conference on Rapid Prototyping, pp. 303-316, Aachen, Germany, 1993.

Carter, Jr. et al., "Direct Laser Sintering of Metals", Solid Freeform Fabrication Proceedings, Sep. 1993, pp. 51-58, The University of Texas at Austin, Austin, Texas, USA.

"Solid Freeform Fabrication Proceedings", Table of Contents, 1993, pp. 1-5. http://home.att.net/~edgrenda2/sf93/sf93.htm.

"The Sinterstation 2000 System Guide to Materials Wax", Dec. 1992, Section "About Wax" p. 2, Section "Features" pp. 9-13, 19-20, 25, 29; Section "Problems", pp. 9 and 11, DTM Corporation, Austin, Texas, USA.

"The Sinterstation 2000 System Selective Laser Sintering Guide to Materials Optimizing & Understanding the Process", Dec. 1992, Section "Optimizing" pp. 1-34, DTM Corporation, Austin, Texas, USA.

"The Sinterstation 2000 System Selective Laser Sintering User's Guide", Nov. 1992, pp. 1-1 to 1-15, pp. 7-1, 7-10 and 7-11, DTM Corporation, Austin, Texas, USA.

Declaration of Long Hoang Phan executed on Jan. 16, 2004.

Declaration of Mary L. Michalewicz executed on Oct. 16, 2001.

Supplemental Declaration of Mary L. Michalewicz executed on Jan. 15, 2004.

Declaration of Michael A. Ervin executed on Jan. 17, 2004.

Gebhardt et al. "SFM-Systems A Comparison of Stereolithographie and Selective Lasersintering", Dedicated Conference on Rapid Prototyping for the Automotive Industries and Laser Applications for the Transportation Industries, Nov. 4, 1994, pp. 289-297, SFM-Systems A Comparison of Stereolithographie and Selective Lasersintering, Aachen, Germany.

"Rapid Prototyping: Schnelle Wege zum Produkt", Jan. 1995, pp. 8-13, 51, Germany.

Wilfried König et al., "Rapid Prototyping—Bedarf and Potentiale", Fertigungstechnik, Aug. 8, 1993, pp. 92-97, Germany.

"The Sinterstation 2000 System Guide to Materials Wax", Dec. 1992, Section "Features", p. 9, DTM Corporation.

* cited by examiner

ADDITIVE MANUFACTURING APPARATUS AND METHOD

The invention relates to an apparatus and method for producing components by additive manufacturing, for example by selective laser melting (SLM) or selective laser sintering (SLS).

BACKGROUND TO THE INVENTION

Additive manufacturing, rapid manufacturing or rapid prototyping methods for producing three-dimensional components are well known in the art (see for example U.S. Pat. No. 4,863,538—Deckard). There are various known methods of additive manufacturing including consolidation of powder materials and curing of polymeric resins (Stereolithography—SLA). SLM and SLS manufacturing methods involve a layer-by-layer consolidation of powder material using a focused energy beam, such as a laser beam or an electron beam.

In a typical selective SLS or SLM process, a thin layer of powder is deposited over a build area or powder bed within a SLS or SLM apparatus. A focused laser beam is scanned across portions of the powder layer that correspond to a cross-section of the three-dimensional article being constructed such that the powder at the points where the laser scans is consolidated either by sintering or by fusion. The cross-section is typically generated from a 3-D description of the component, which is itself generated by scanning an original component or from computer-aided design (CAD) data.

After consolidation of a layer, the build surface is lowered by the thickness of the newly consolidated layer and a further layer of powder is spread over the surface. Again, the surface is irradiated with a laser beam in portions of the layer that correspond to a cross-section of the three-dimensional article, the newly consolidated layer being joined to the initial consolidated layer. This process is repeated until the component is completed.

Typical additive manufacturing apparatuses build components onto a rigid metallic plate or substrate from which the component can be removed or, alternatively, which can be incorporated into the final component. Where component parts are removed from the rigid substrate, these parts are generally removed by mechanical means such as filing, sawing, milling, spark discharge etc. Such removal processes are time-consuming, expensive and need to be performed carefully so as not to damage finished parts. In addition, the rigid metallic substrate needs to be refurbished after each use before it can be used for another build. Such refurbishment is typically carried out by milling the substrate flat. Thus, a layer of the substrate is typically lost every time it is used and such substrates are, therefore, a consumable item.

The rigid substrate must be made of a material to which the build material (i.e. the material used to build the desired component) will weld or adhere during processing. Very often the substrate needs to be of a similar material or the same material as the build material. Such consumable build plates can be extremely expensive. For example, a titanium build plate for use in a selective laser melting apparatus having dimensions of 250 mm by 250 mm can cost in excess of £1000. The accumulated cost of machining removal of components, refurbishment of the build plate, and the gradual loss of the build plate through erosion can add a significant amount to the cost of individual components produced by the additive manufacturing process.

Ideally, components could be built on the free powder bed, i.e. built without being constrained to a build substrate. This is not usually possible with additive manufacturing processes such as SLM and SLS as there are high thermal stresses generated in parts as they are produced. Distortion during deposition of the initial layers of the component could severely affect the integrity of the finished component. Electron beam manufacturing process such as E-Beam melting (EBM) or E-Beam sintering (EBS) are similar processes to SLM and SLS. EBM often utilises a higher build temperature than SLM and this means that the thermal stresses in the components can be lower. Thus, EBM allows, in some circumstances, the production of self supporting components that do not need to be bonded or adhered to a substrate. It is, however, sometimes desirable or necessary to anchor a part when using EBM and in such cases anchoring is done in similar ways as described above for SLM processes.

A typical prior art apparatus is disclosed by U.S. Pat. No. 5,753,274. This US patent describes an apparatus for producing a three-dimensional object by solidification of successive layers of a powder material, the apparatus including a rigid base plate made from a material to which the powder adheres when being solidified and means for removably connecting the base plate to support means in the apparatus.

SUMMARY OF INVENTION

The invention provides an apparatus and method according to the appended independent claims which reference should now be made. Preferred or advantageous features of the invention are defined in dependent sub-claims.

Thus, in a first aspect the invention may provide an apparatus for forming a three-dimensional object by layer-wise addition of a build material, the apparatus comprising, a build-support for supporting the object during forming, and a base-layer. The base-layer is removably securable to the build-support and the three-dimensional object can be anchored to the base-layer during forming.

The base-layer may be described as insufficiently rigid to anchor the object during forming until it has been secured to the build-support.

It may be advantageous that the base-layer is capable of being placed in tension. Tensioning may render the base-layer rigid enough to act as an anchor for building an object and may simultaneously bring the base-layer into intimate contact with the build-support. Thus, the base-layer may be unable to function as an anchor for formation of a three-dimensional object until it is placed in tension.

The apparatus may comprise a tensioning device for placing the base-layer in tension. Such a device may involve a clamping system or rollers or any mechanical means for placing the base-layer in tension.

Preferably the base-layer is a flexible material such as a film, sheet, foil or mesh and preferably it is made of a material to which the build material can be adhered.

The base-layer of this aspect of the invention is, thus, a disposable item. Consequently, there is no need for a costly refinishing process as required when using prior art rigid substrates. In addition, the base-layer is of a significantly lower cost than a rigid base material. In the example given above, a titanium base plate could cost in excess of £1000. A titanium base-layer according to the first aspect of the invention for use over the same build area costs in the region of £16.

Advantageously, the use of a base-layer that is an insufficiently rigid, flexible or deformable material such as a film, sheet, foil or mesh, may allow the finished component to be removed from the base-layer by means of peeling or by tearing.

Peeling, or tearing of the foil around the finished component, may be a considerably less expensive method of removing a component from its anchoring layer than the machining methods typically employed when using a rigid plate. A further advantage may be that removal of a component from a base-layer according to this aspect of the invention offers less risk that the finished component will be damaged during the removal process. The base-layer will deform or tear before there is any damage to the finished component. This is in contrast to the situation where the component is built onto a rigid plate, in which case the plate is likely to be as strong or stronger than the finished component meaning that care must be taken when removing the component in order to avoid damaging the finished component or object.

A further advantage of the use of a base plate according to this aspect of the invention may be that the removal of the base-layer from the build chamber of an additive manufacturing apparatus may be carried out at a considerably faster speed than, for example, the removal of a rigid plate from the build chamber.

If the base-layer is a metallic foil, sheet or film it is preferably less than 250 microns thick, and particularly preferably thick enough to allow a first layer of build material to be anchored thereto. Optimum ranges of thickness will depend on many factors including the material used for the build material and for the build layer, the power of the laser or electron beam, the particle size of the build material and other aspects of build protocol. Advantageously, such thicknesses may allow the base-layer to be of low cost and sufficiently flexible for removal by peeling or tearing from the finished component, while protecting the build-support from substantial structural damage.

Particularly preferably the base-layer is between 50 microns and 150 microns, or between 75 microns and 125 microns.

If the base layer is a mesh it preferably consists of a series of wires, for example cylindrical wires, woven together such that the wires can slide individually over each other. The mesh size is preferably of an order that allows a powder used to form the component to fall between the strands of wire. This may allow a mechanical interlock between the powder and the mesh and may facilitate the formation of initial layers of the component as the powder is constrained by the mesh. Thus, the first layers of a construction may be more easily produced using a mesh base-layer.

Typical powders used in additional manufacturing processes have average particle diameters between 20 and 100 microns. Thus, a preferred mesh may have openings of between 75 and 300 microns with the wires forming the mesh being of similar dimensions. Such a mesh will have a thickness of between 100 and 500 microns, preferably between 200 and 400 microns, for example about 300 microns.

An advantage of using a mesh as a base-layer is that it may be easier to tension a mesh over the surface of a build-support than a foil, particularly if the mesh used has strands that are capable of sliding over one another. A mesh is likely to be more compliant than a foil of similar thickness and variations in strain can be accommodated by a mesh without wrinkling or buckling more easily than in the case of a foil.

A mesh may be less prone to buckling due to thermal stresses such as may be caused during laser consolidation of a powder. Thermal stresses may be accommodated by compressions and tensions in individual strands rather than being distributed as a membrane stress throughout a foil.

A mesh or net base-layer structure may also allow for a certain amount of compliance during a build. In this way stresses and strains generated during the build may be accommodated and there may be a low amount of residual stress build up in the component during its formation.

It is important that the base-layer is of a material to which a first layer of build material will adhere sufficiently to function as an anchor for the subsequent construction of the remaining layers. The base-layer may make a full weld with the build material, or may form a sintered bond or diffusion bond or may simply adhere sufficiently for a build to be carried out (for example by keying or by action of surface tension). It may be advantageous that the base-layer is of substantially the same chemical composition as the build material. For example, if the build material is a titanium alloy then it may be advantageous that the base-layer is of the same titanium alloy or of a similar titanium alloy. This has the advantage that the build material will join to the base-layer and the further advantage that contamination of the final component by diffusion of chemical elements in the base-layer is unlikely to occur. In the case where the build material is fully integrated with the base-layer, for example by welding, then the use of a base-layer of the same chemical composition as the build material allows the final component to be removed from the base-layer by simply tearing or trimming the base-layer from around the anchored area of the base-layer. In this case the base-layer that was integrated with the build material may become part of the finished component or may be removed by a subsequent machining operation.

Preferably the apparatus further comprises a means for selectively joining or consolidating regions of power to form the object. Preferred examples of such means include laser generation systems and electron beam generation systems. Both laser and electron beam systems produce a high energy beam that can deliver a sufficiently high energy density to a point to enable sintering or melting of powder at that point. Thus, the apparatus is preferably an apparatus for producing an object by selective laser melting, selective laser sintering, electron beam melting, or electron beam sintering.

Advantageously, the apparatus may comprise a clamp for securing the base-layer to the build-support. Clamping has the advantage that it is a simple to implement means of securing the base-layer. Clamping members may be positioned at two opposite sides of the build-support to tension the build layer over the build support or may be positioned on three or four of the sides of the build-support. Preferably, the clamp secures the base-layer such that it is held in contact with the build-support over substantially all of its area.

Advantageously, the means for securing the base-layer to the build-support may include a roller mechanism for tensioning the base-layer across the build-support. Such roller means may allow the base-layer to be adjustably tensioned such that it is constrained in relation to the build-support and in contact with the build-support over substantially or of it's area. Preferably such a roller means is arranged to be at a lower level than the build-support, i.e. the base-layer when secured to the base support is at a higher level within the apparatus than the roller mechanism for tensioning base-layer. Such a roller mechanism may comprise two rollers, one to be mounted within the apparatus at each side of a build-support.

The base-layer may be secured to the build-support by application of a vacuum. For example, the build-support may include holes or channels to which a vacuum can be applied lowering the pressure with respect to the atmosphere within the build chamber of the apparatus. In this circumstance a base-layer applied to the build-support would be held in place by the pressure differential. Use of a vacuum for securing the base-layer to the build-support may be advantageous as vacuum pressure may be applied and removed at speed thus allowing base-layers to be exchanged swiftly. Use of vacuum may also eliminate the need for clamping mechanisms, which would have to be incorporated into the apparatus such that they didn't hinder the application of successive layers of building material by a wiper arm.

The base-layer may also be secured to the build-support by a releasable physical bond. Examples of such bonds may include adhesives, solders, or braised bonds. As an example, the base-layer could be applied to a build-support with a low melting point alloy secured in between. The assembly may then be heated in an oven to above the melting point of the low melting point alloy and subsequently allowed to cool down again solidifying the alloy. The alloy could thus form part of a soldered joint between the build-support and the base-layer. Such a joint could be removed by the inverse process, i.e. by heating the build-support base-layer assembly holding the finished built component in an oven until the low melting point alloy melted and then removing the base-layer from the build support.

Advantageously, the build-support may comprise a high thermal conductivity material. Particularly suitable materials include copper or copper alloys. During the build of a component a large amount of heat is provided by the energy beam in order to melt or sinter the build material. It is advantageous that this heat can be removed from the component in a controlled manner and, thus, a heat flow path between the component and the base-layer and the build-support on which the base-layer is supported may be advantageous. Copper alloys or copper or other high thermal conductivity materials may allow any hot spots to be equalised rapidly, thereby alleviating any thermal distortions.

Advantageously, the build-support could include cooling means such as air cooling channels or water cooling channels.

Advantageously the build-support may have rounded edges to reduce deformation of the base-layer. Such attention to the shape of the build-support may be important where the base-layer is secured to the build-support by means of clamping or by roller tensioning. With such securing mechanisms sharp edges on the build-support may crease the base-layer, or otherwise introduce points of weakness in the base-layer, thereby reducing the integrity of the base-layer and its ability to support and constrain a component during a build.

It may be advantageous that the build-support and the base-layer are made from dissimilar materials. Thus, the base-layer may be made from a material that has suitable properties for adhering to the build material of choice while the build-support fulfils other properties, such as high thermal capacity. It may also be advantageous that the build-support and the base-layer are made from materials that do not easily bond with each other on application of heat. This may reduce the chances that the base-layer will weld or sinter to the build-support during deposition of the initial layers of a component.

In a second aspect the invention may provide an apparatus for forming a three-dimensional object by layer-wise addition of a build material comprising a build-support for supporting the object during forming, and a base-layer removably securable to the build-support to which the object can be anchored during forming, in which the base-layer is secured to the build-support by application of a vacuum.

As discussed above in relation to the first aspect of the invention, a vacuum securing means or mechanism may offer advantages such as speed of installation of a base-layer and speed of removal of a base-layer at the end of a build.

In a third aspect the invention may provide a method of forming a three-dimensional object by layer-wise addition of build material comprising the steps of securing a removable base-layer to the build-support of an apparatus for forming a three-dimensional object by layer-wise addition of a build material, forming a first layer of the object on the base-layer such that it is anchored to the base-layer, forming a plurality of subsequent layers on the first layer until the three-dimensional object has been formed, and removing the base-layer and the three-dimensional object from the base-layer of the apparatus. Preferably the base-layer is insufficiently rigid to anchor the object during forming until tensioned or until secured to the build-support. Preferably the base-layer is a mesh, film, sheet or foil made from a material to which the build material can be adhered.

The method may be advantageously used where the object is formed by selective laser melting, selective laser sintering, electron beam melting, or electron beam sintering.

Advantageously the method may further comprise the step of peeling the base-layer from the three-dimensional object. Peeling of the base-layer does not require any special equipment of tooling and may be a speedy, cost-effective method of removing the object from the base-layer.

Alternatively, the removal of the object from the base-layer may comprise steps of ripping or cutting the base-layer around the three-dimensional object. The three-dimensional object may then be removed from the base-layer by mechanical or chemical process, for example by grinding or by etching, or by deconstructing the base layer in the case of a mesh. Deconstruction of a mesh may involve the steps of cutting the mesh around the completed component or part and then removing each strand individually from the part. Such a deconstruction process may make it easier to remove the base layer.

Alternatively, the base-layer may be incorporated in the three-dimensional object.

Advantageously the base-layer may be secured to the build-support by application of a vacuum or by application of a clamping means or a roller securing means. Such securing means have been described above in relation to the first aspect of the invention.

It is preferable that the base-layer is less than 500 microns thick, preferably less than 250 microns thick and particularly preferably between 50 and 150 microns thick.

In a further aspect the invention may provide a method of forming a component that incorporates both a flexible mesh, sheet or foil and structural elements added to the flexible mesh, sheet or foil by an additive manufacturing process. Thus, at least a portion of the base-layer becomes an integral part of the finished component. The method according to this aspect is carried out as described for any aspect above with the difference that some structures added to the base-layer are not removed or trimmed from the base-layer.

Thus, the invention may provide a method of making a conformal geometry for controlling fluid dynamic flow. For example, the structures produced on the base-layer could be designed to affect fluid flow or air flow, e.g. structures for inducing turbulence, changing boundary layers or affecting mixing. The component produced is a sheet or foil having the desired structures built on it and this sheet or foil may be applied to surfaces of different shapes.

The invention may also provide a component for altering fluid flow as described.

An example of a conformal fluid flow geometry is a sheet for applying to the surface of, for example, and aircraft wing to alter the air flow across the wing. The component comprises a sheet of flexible material of low thickness, for example between 50 microns and 150 microns, onto which a plurality of air-flow modifying structures have been constructed. The sheet can easily be applied to existing structures by adhesion or diffusion bonding or any typical method of attaching sheets to structures.

Fluid flow geometries as described herein may be used in many applications where fluid flow modification is desirable, for example on turbine blades or underwater craft.

In a further aspect the invention may provide a conformal antenna and method of making such an antenna. Antenna structures may be built onto a suitable foil or sheet (using additive manufacturing as described in any aspect above) and the conformal antenna may then comprise the foil or sheet with the integrated antenna structures. Such conformal antenna can be applied to the surface of components, for example the mast of a ship, where a surface having a plurality of antenna structures is desirable.

Conformal antenna as described herein may be of use, for example, to alter a structure's electromagnetic profile. As an example, the radar reflecting properties of a structure may be altered by applying a suitable antenna structure to the surface.

The use of a flexible material as a base layer for antenna structures may allow production of an antenna that is tuneable, for example by deforming the base-layer of the tuneable antenna to alter the spatial relationship of various antenna components built onto the layer.

In a further aspect the invention may provide a method of forming a three-dimensional object by layer-wise addition of a build material comprising steps of securing a removable base-layer by application of a vacuum to a build-support of an apparatus for forming a three-dimensional object by layer-wise addition of a build material, forming a first layer of the object on the base-layer such that it is anchored to the base-layer, forming a plurality of subsequent layers of the first layer until the three-dimensional objects have been formed, and removing the base-layer and the three-dimensional object from the base-layer of the machine.

Preferably the first layer of the object is formed using a beam power or a beam powder density that is to low to melt through the base-layer. Thus the base-layer does not weld or adhere to the build-support leaving the integrity of the build-support intact.

Preferably a method according to any method described above can include the steps of forming between one and twenty and preferably between one and ten layers of the component using a lower incident beam power density than it is used to produce subsequent layers. I.e., the initial layers laid down onto the base-layer are produced using a low beam power density or a low beam power and then subsequent layers are produced using the usual beam power density or beam power required to form the desired component.

Figure 2:
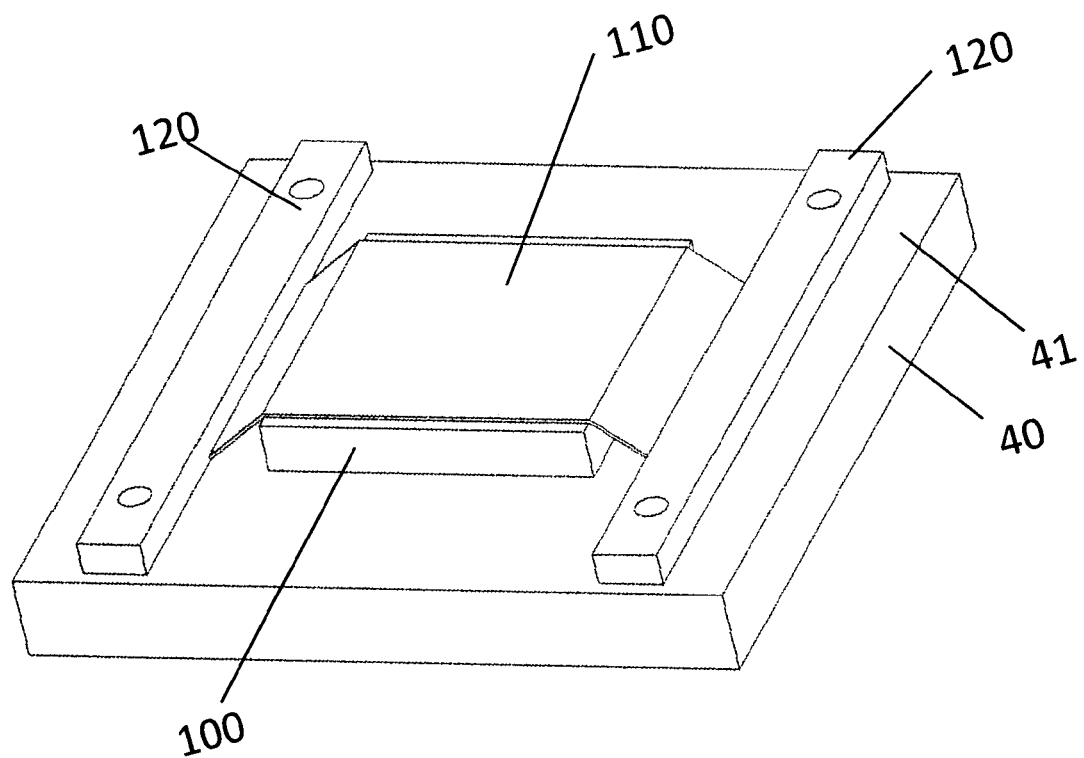
Figure 3:
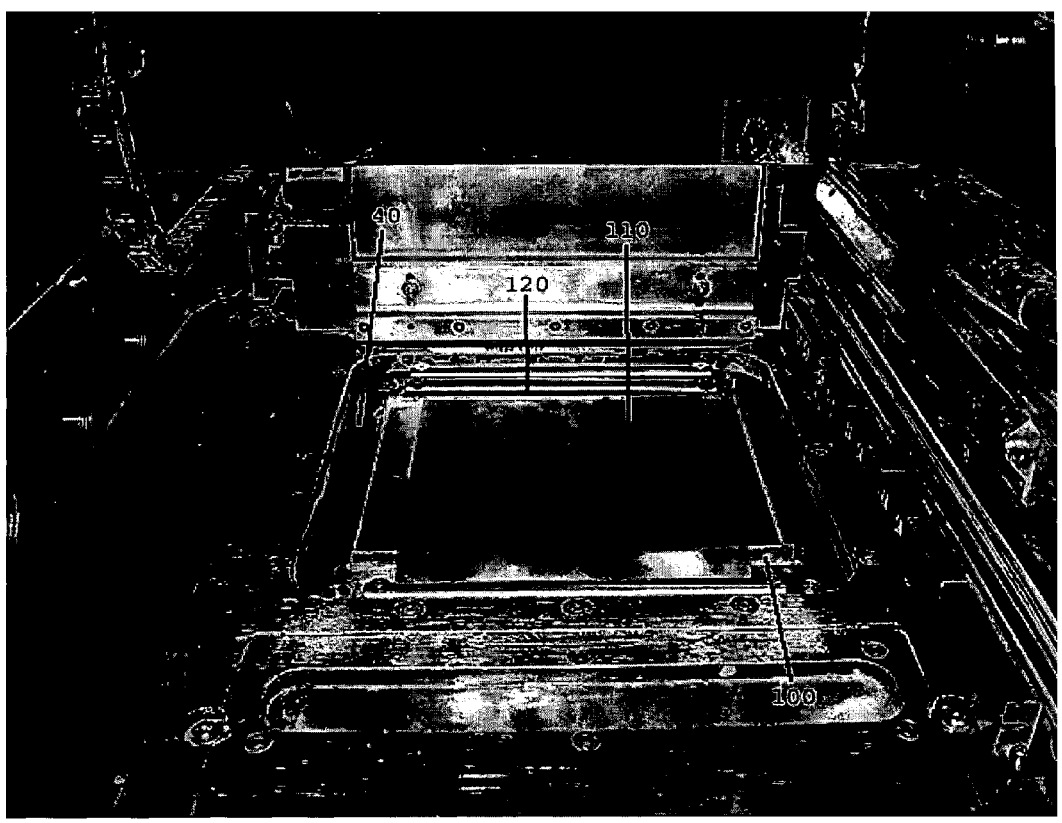
Figure 4:
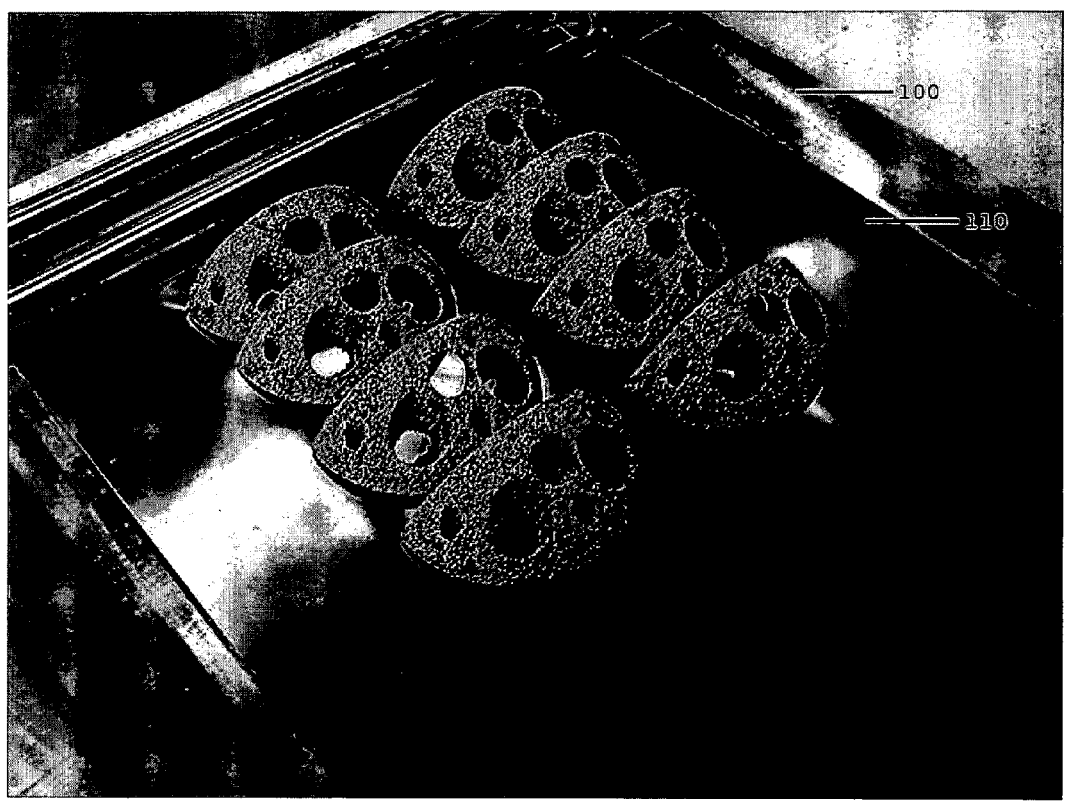
Figure 5:
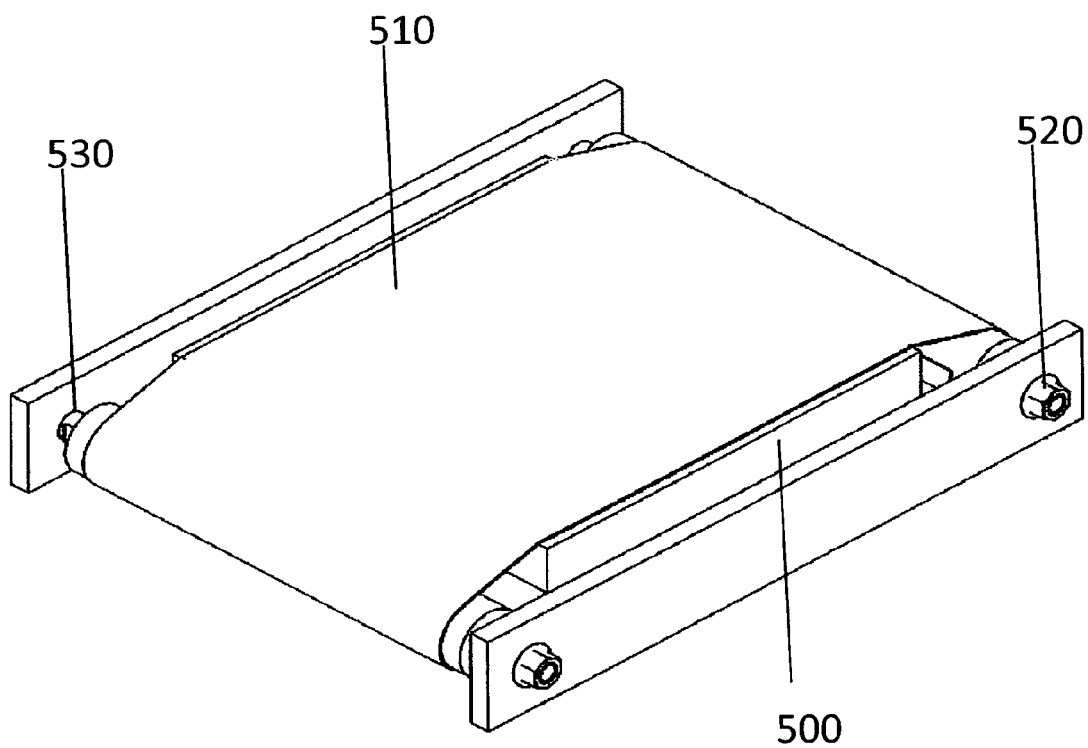
Figure 6:
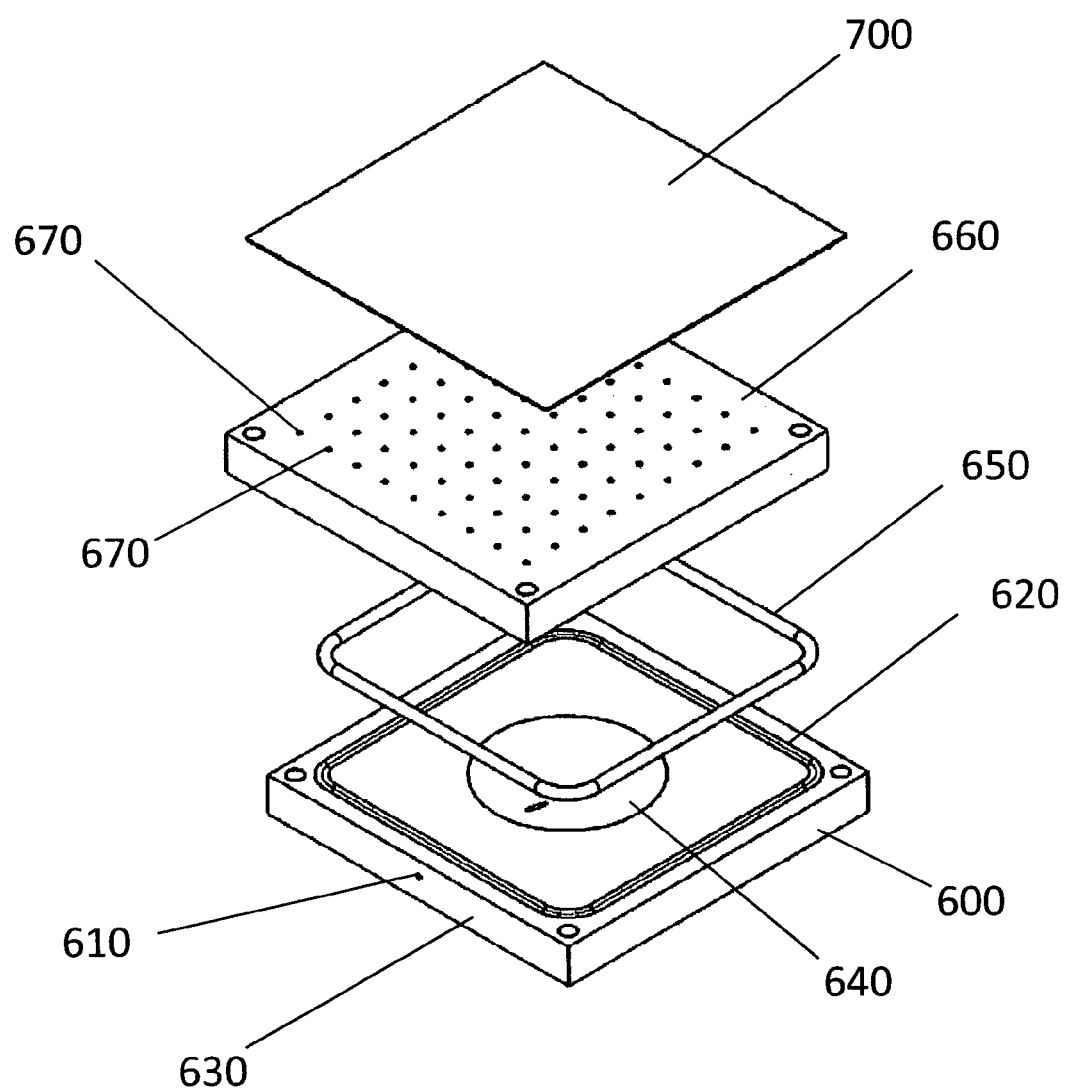
Figure 7:
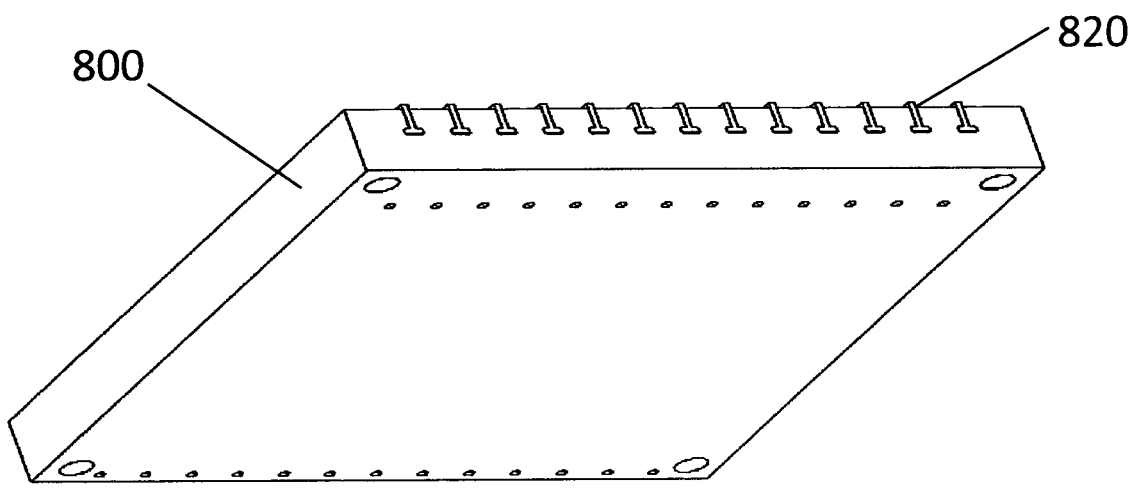
Figure 8:

Preferred embodiments of the invention will now be described with reference to figures in which;

FIG. 1 is a schematic illustration of a build chamber in a typical SLM apparatus, FIG. 2 illustrates a base-layer secured to a build-support according to an aspect of the invention, FIG. 3 illustrates the base-layer and build-support of FIG. 2 mounted in an SLM apparatus, FIG. 4 illustrates a plurality of three-dimensional objects formed on a base-layer according to FIG. 2, FIG. 5 illustrates a base-layer secured to a build-support according to an aspect of the invention FIG. 6 illustrates a vacuum chuck according to an aspect in the invention, FIG. 7 illustrates an alternative method for securing a build to build-support by the use of structural sections embedded in a build-support, and FIG. 8 illustrates a three dimensional object in the process of being removed from a mesh base-layer.

FIG. 1 illustrates a typical selective laser melting apparatus 10. The apparatus defines a build chamber 20 within which a three-dimensional component 30 is produced, and comprises a lowerable build platform 40 on which the three-dimensional component 30 is supported. The build chamber 20 also houses a powder dispensing and coating apparatus 50 for spreading layers of powder 55 over the surface of the build platform. An optical module 60 (either housed within or outside the build chamber) delivers a laser beam 65 for irradiating the powder spread over the build surface 45. The build platform 40 is arranged to be lowerable within the bore 70 of a build cylinder 75, which allows the build surface 45 to remain in substantially the same position within the machine while the object 30 is built up from successive powder layers. The build platform incorporates both a build-support and a base-layer that is removably securable to the build-support to which the object 30 can be anchored during its formation. The base-layer protects the build-support from physical contact with the component as it is built.

FIG. 2 illustrates a build-support and base-layer according to an aspect of this invention. A build platform 40 is constructed from a plate of stainless steel and is arranged to be lowerable within the bore of the build cylinder. Arranged on an upper surface 41 of the build platform is a build-support 100 made from a copper plate. Copper is used for the build-support material due to its excellent thermal conductivity. Secured over an upper surface of the build-support is a base-layer 110. The base-layer is a 100 micrometre thick foil and is secured over the surface of the build-support by means of clamps 120, which fasten to the build platform and cause the foil to be pulled taut, or tensioned, over the upper surface of the build-support. The foil 110 can be made of any material to which the object being formed will adhere. It is often advantageous that the foil material be the same composition as the powder from which the object is being formed, for example, if the objects being formed are titanium 6 aluminium 4 vanadium alloys (Ti6AL4V), as commonly used in the aerospace industry, then it is advantageous that the foil is a 100 micron thick foil of Ti6AL4V alloy. The use of the same material for the foil and for the build material ensures that the build material can be anchored to the base-layer foil during the initial stages of construction of the component and, additionally, may help prevent contamination of the component or object formed by rogue alloy elements in the base-layer.

Although a foil is used as a base-layer in this specific example, a mesh could alternatively be used. Use of a mesh may provide additional benefits over the use of a foil, as described above.

While the illustration in FIG. 2 show a foil that is clamped on to sides of a build-support it is easily conceivable that for additional constraint clamps may be provided on three sides of the build-support or four sides of the build-support.

In use, a foil 110 is clamped to surface of the build platform by means of a clamping element constraining the foil to the platform on one side of the build-support, stretching the foil across the build-support and then clamping the foil at the other side of the build-support with a second clamping element such that there is sufficient tension to press the surface of the foil to the build-support. FIG. 3 illustrates a commercially pure titanium foil base-layer secured by a clamping means over a copper build-support within the build chamber of a SLM apparatus. In a typical SLM process using a solid build plate, the first few layers of a component are usually produced using a relatively high laser power to ensure that the first layers are solidly bonded or fused to the support. The bulk of the build is then produced at a slightly lower laser power. With use of a base-layer as defined in the various aspects of this invention it is important that the initial layers of a component or build are not produced such that the component adheres to the build-support beneath the base-layer. The power required to deposit the initial layers without "burning through" the base-layer will depend on many factors including the type of material, the thickness of the base-layer, the particle size of the material, the thermal properties of the build-support, etc. It may be advantageous, therefore, to produce the initial layers at the same power as the bulk of the build or at a lower power to the bulk of the build to lower the chances that the build will adhere to the build-support through the base-layer.

In an example illustrated in FIG. 4, a commercially pure titanium foil was secured, as a base-layer, to a copper build-support using clamps system in an MCP Realizer II selective laser melting machine. This machine has a build area of 250 by 250 mm and operates a 200 watt ytterbium fibre laser with a wavelength of 1021 nanometres. Eight components made from commercially pure titanium powder were produced. The build protocol adopted involved the lower ten layers being produced at a laser power of 70 watts. The laser power, then increased to 92 watts for the production of subsequent layers of the components. (I note that if this build was carried out on a solid plate then the initial layers would typically have been built at a high laser power, for example 121 watts, before reducing the power to 92 watts for the subsequent layers). The use of this low power was sufficient to anchor the initial layers of the component to the base-layer such that the desired component geometry could be successfully produced (as illustrated in FIG. 4).

Once the build had been completed the foil base-layer was swiftly removed from the apparatus by unclamping from the build platform. The base-layer was then removed by peeling away from the components. The flexible nature of the base-layer allows it to be removed from the components by either peeling or, where peeling fails due to a high degree of bonding between the component and the base-layer, by tearing of the base-layer. Thus, the components can be swiftly removed from the base-layer and sent for any finishing operations that are subsequently required.

FIG. 5 illustrates an alternative means for securing the base-layer to a build-support according to an aspect of the invention. As can be seen, the base-layer 510 is a flexible material or foil that is secured over a build-support 500. The base-layer is wound at either end on to first 520 and second 530 rollers. The rollers allow the tension in the base-layer to be adjusted as required to secure it over the build-support.

A further advantage of use of tensioning rollers as illustrated in FIG. 5 is that a finished component may be removed from the base-layer by tearing or peeling and the base-layer may then simply be rolled forward so that the used portion is taken up on the first roll 520 while fresh base-layer is released over the build-support from the second roll 530. Such a system may increase efficiency at change over.

FIG. 6 illustrates a further method of securing a base-layer to a build-support. In this example the build-support is a modular component made of two copper plates bolted together. A lower copper plate 600 defines a gas channel 610 and a rim for receiving an o-ring 620. The gas channel 610 is defined through an edge of the lower plate 630 and extends to a dished region central to an upper surface of the first plate 640. An o-ring 650 seats in the ridge 620 of the lower plate and an upper plate is fastened thereto 660. The upper plate defines a plurality of holes through its thickness 670. Thus, when clamped together the upper and lower plate with the o-ring between form a unit having a substantially hollow interior and gaseous communication between the channel 610 and the holes 670. Such a structure, or other similar structures performing the same function, can be termed a vacuum chuck.

In use gas channel 610 is coupled to a vacuum pump and, thus, gas (which may be air or any gas forming the atmosphere within the build chamber) is removed from the central portion of the chuck. As channel 610 and hole 670 are in gaseous communication, gas removed from channel 610 by the vacuum pump is replaced by gas entering the vacuum chuck through the plurality of holes 670.

If, as illustrated in FIG. 6, a removable base-layer is positioned on the upper surface of the vacuum chuck, the pressure differential caused by the vacuum results in the base-layer being secured to the surface of the vacuum chuck.

Such a system may be a efficient method of applying a base-layer to a build-support (i.e. the vacuum chuck) particularly where the base-layer is a flexible material. It is noted that the base-layer need not be a flexible material to function with a vacuum chuck according to an aspect of this invention.

An advantage of the vacuum chuck over, for example a clamp, is that the base-layer may simply need to be positioned over the vacuum chuck and the vacuum applied in order to secure the base-layer for a build operation, thereby eliminating potentially fiddly clamping operations.

FIG. 7 illustrates an alternative method of securing a build to a build-support. A build-support 800 consists of a plate that is mountable to a build platform (for example by bolts). The platform defines a number of cut out sections at an upper surface, for example T or L sections, into which corresponding mating sections of a base material (for example commercially pure titanium if building a commercially pure titanium product) can be slotted. In use initial layers of a component are formed by bridging the gap between imbedded sections. Once formed, these sections can be released from the platform by sliding and the cut out sections removed from the build.

FIG. 8 illustrates a specific embodiment of a three dimensional object 900 (in this case a rook from a chess set) that has been formed by a SLS process onto a mesh base layer 910. The mesh base-layer was secured within a SLS apparatus by means of clamps tensioning the mesh over a build-surface. The object 900 was formed under conditions such that it did not fully weld to the mesh. This method has been described above in relation to forming an object on a foil base layer. As can be seen from FIG. 8, the object 900 can be easily removed from the mesh 910 by peeling the mesh away from the base of the object.

The invention claimed is:

1. An apparatus for forming a three-dimensional object by layer-wise addition of a build material, the apparatus comprising:
   a build-support for supporting the object during forming, and
   a flexible metallic mesh, film, or foil that is removably securable to the build-support, and to which the object can be anchored during forming, wherein
   the mesh, film, or foil is made of a material to which the build material can be adhered, and
   the apparatus is configured to form the object by selective laser melting, selective laser sintering, electron beam melting, or electron beam sintering.

2. An apparatus according to claim 1 further comprising a tensioning device for putting the mesh, film, or foil in tension.

3. An apparatus according to claim 1, wherein the mesh, film, or foil is less than 500 μm thick.

4. An apparatus according to claim 1, wherein the mesh, film, or foil is between 50 μm and 150 μm thick.

5. An apparatus according to claim 1, wherein the mesh, film, or foil is of substantially the same chemical composition as the build material.

6. An apparatus according to claim 1 for forming an object from a build material powder, further comprising a means for selectively joining regions of powder to form the object.

7. An apparatus according to claim 1 further comprising a clamp for securing the mesh, film, or foil to the build-support and/or for tensioning the mesh, film, or foil.

8. An apparatus according to claim 1 further comprising a roller means for tensioning the mesh, film, or foil.

9. An apparatus according to claim 1, wherein the mesh, film, or foil is secured to the build-support by a releasable physical bond.

10. An apparatus according to claim 1, wherein the build-support comprises a high thermal conductivity material.

11. An apparatus according to claim 1, wherein the build-support incorporates a cooling means.

12. An apparatus according to claim 1, wherein the mesh, film, or foil can be peeled from the object after forming.

13. An apparatus according to claim 1, wherein the build-support has rounded edges to reduce deformation of the mesh, film, or foil.

14. An apparatus according to claim 1, wherein the mesh, film, or foil is secured to the build-support so as to provide a thermal link therebetween.

15. An apparatus according to claim 1, wherein the build-support and the mesh, film, or foil are made from dissimilar materials.

16. A method of forming a three-dimensional object by layer-wise addition of a build material, the method comprising the steps of:
   securing a flexible metallic mesh, film, or foil in a removable manner to a build-support of an apparatus for forming a three-dimensional object by layer-wise addition of a build material,
   forming a first layer of the object on the mesh, film, or foil by selective laser melting, selective laser sintering, electron beam melting, or electron beam sintering such that it is anchored to the base-layer,
   forming a plurality of subsequent layers on the first layer by selective laser melting, selective laser sintering, electron beam melting, or electron beam sintering until the three-dimensional object has been formed, and
   removing the mesh, film, or foil with the three-dimensional object attached from the build-support of the apparatus.

17. A method according to claim 16, further comprising the step of peeling the mesh, film, or foil from the three-dimensional object.

18. A method according to claim 16, further comprising the steps of:
   ripping or cutting the mesh, film, or foil around the three-dimensional object, and
   optionally removing the mesh, film, or foil from the object by a mechanical and/or a chemical process.

19. A method according to claim 16, wherein the mesh, film, or foil is secured to the build-support by application of a clamp.

20. A method according to claim 16, wherein the mesh, film, or foil is less than 500 μm thick.

21. A method according to claim 16, wherein the first layer is formed using a beam power or a beam power density too low to melt through the mesh, film, or foil.

22. A method according to claim 16, wherein between one and twenty of the first-formed layers are formed using a lower incident beam power density than that used to produce subsequent layers.

23. A method according to claim 16, further comprising the step of tensioning the mesh, film, or foil such that it is rigid enough to anchor the three dimensional object.

24. An apparatus for forming a three-dimensional object by layer-wise addition of a build material, the apparatus comprising;
   a build-support for supporting the object during forming, and
   a mesh, film, or foil that is removably securable to the build-support and to which the object can be anchored during forming, wherein
   the mesh, film, or foil is insufficiently rigid to anchor the object during forming until secured to the build support, and
   the apparatus is configured to form the object by selective laser melting, selective laser sintering, electron beam melting, or electron beam sintering.

25. A method of forming a three-dimensional object by layer-wise addition of a build material comprising the steps of
   securing a mesh, film, or foil in a removable manner to a build-support of an apparatus for forming a three-dimensional object by layer-wise addition of a build material,
   forming a first layer of the object on the mesh, film, or foil by selective laser melting, selective laser sintering, electron beam melting, or electron beam sintering such that it is anchored to the base-layer,
   forming a plurality of subsequent layers on the first layer by selective laser melting, selective laser sintering, electron beam melting, or electron beam sintering until the three-dimensional object has been formed, and
   removing the mesh, film, or foil and the three-dimensional object from the build support of the apparatus,
   wherein the mesh, film, or foil is insufficiently rigid to anchor the object during forming until secured to the build-support.

* * * * *